Patented Aug. 25, 1953

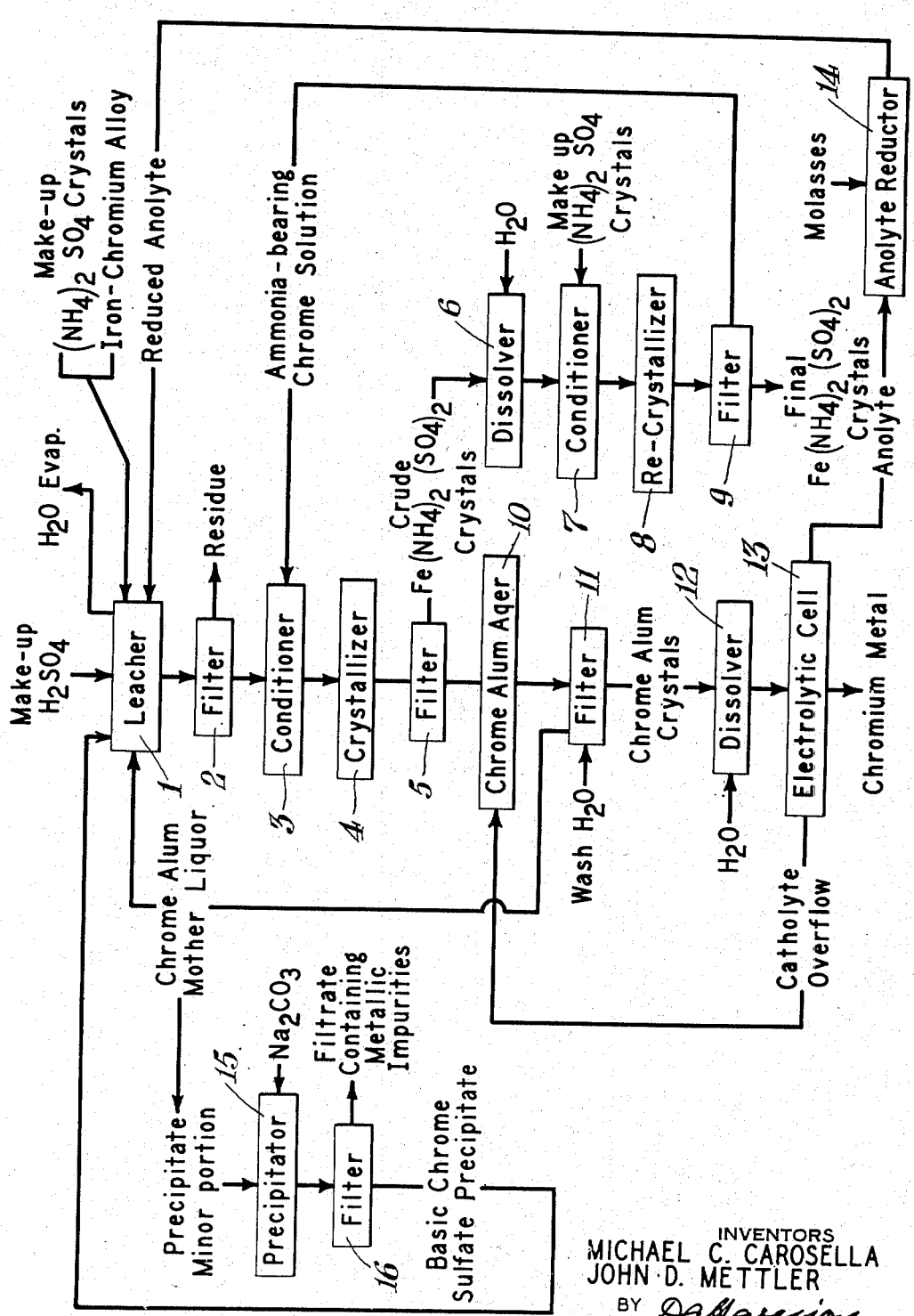

2,650,192

UNITED STATES PATENT OFFICE 2,650,192

ELECTROWINNING OF CHROMIUM

Michael C. Carosella and John D. Mettler, Niagara Falls, N. Y., assignors to Union Carbide and Carbon Corporation, a corporation of New York Application June 7, 1951, Serial No. 230,412

3 Claims. (Cl. 204—105)

The present invention relates to an improved cyclic process for the preparation of chromium metal from iron-chromium alloys and, more particularly, to such a process wherein the chromium metal is obtained by electrowinning from a concentrated solution of chromium ammonium alum, hereinafter referred to as chrome alum.

Heretofore, it has been the practice to employ a cyclic process, as disclosed by Lloyd et al. in The Journal of the Electrochemical Society, vol. 97, No. 7, July 1950, wherein depleted liquor overflow from the chrome alum ageing tank is recycled to the leaching step to dissolve further iron-chromium alloy. It has been found, however, that when such a process is employed the initially high current efficiencies cannot be maintained due to the build-up of metallic impurities in the cycle, and as operation continues the drop in current efficiency is steady and appreciable.

It is an object of the present invention to provide a satisfactory method for the removal of these metallic impurities from the cycle.

Another aim is to provide for the maintenance of the initially high current efficiency in the electrowinning step.

Other advantages and aims of the invention will be apparent from the following description and appended claims.

The single figure is a flow sheet illustrating the steps of the improved cyclic method which constitutes the invention.

In accordance with the present invention an iron-chromium alloy is treated with a mineral acid, for example sulfuric acid, the major portion of which is obtained from recycled reduced anolyte and the remainder from make-up acid. To complete the cycle chrome alum mother liquor and basic chrome sulfate precipitate are recycled to the leach liquor. Ammonium sulfate crystals are also added to the leach liquor to make up for losses occurring later in the cycle. This leaching step is indicated in box 1 of the flow sheet. The resulting pulp is filtered to remove the residue which consists largely of silica and carbon. This step is evinced by box 2 of the flow sheet. The filtrate is passed into a conditioner into which is introduced a chrome solution which consists of recycled filtrate from the filtration step indicated by box 9 in the flow sheet. The resulting solution is heated to a temperature of approximately 80° C. This conditioning step is denoted by box 3 of the flow sheet. The conditioned solution is passed to the crystallizer where it is cooled to approximately 5°–10° C. to produce crystallization of crude iron-ammonium sulfate crystals. This step is shown by box 4 of the flow sheet. These crystals are separated from the chrome liquor by filtration. This step is indicated by box 5 of the flow sheet. The crude iron-ammonium sulfate crystals are re-dissolved in water. This step is denoted by box 6 of the flow sheet. Thereupon the resulting solution is conditioned by the addition of ammonium sulfate and heating to approximately 80° C. This step is indicated by box 7 of the flow sheet. This conditioned solution is cooled to approximately 5°–10° C. whereupon a recrystallization of final iron-ammonium sulfate crystals occurs. This recrystallization step is signified by box 8 of the flow sheet. The final iron-ammonium sulfate crystals are then removed from the solution by filtration which is indicated by box 9 of the flow sheet. The ammonia-bearing chrome solution obtained as filtrate is recycled to conditioning step 3. The chrome liquor obtained as filtrate from step 5 is at the same time fed into the chrome alum ageing tank where chrome alum crystals will form. This step is illustrated by box 10 of the flow sheet. The chrome alum crystals are separated from the chrome alum mother liquor by filtration and then washed. This step is shown by box 11 of the flow sheet. The washed chrome alum crystals are re-dissolved in water and the resulting solution is introduced into the cathode compartment of a diaphragm electrolytic cell as cell feed. The dissolver is indicated as box 12 of the flow sheet.

Electrolysis of such solution in a cell where the bath temperature is maintained between 30° C. and 65° C., and the catholyte pH controlled between 1.5 and 3.0 results in the formation of chromium metal at the cathode and sulfuric acid containing some chromic acid at the anode. This step is illustrated by box 13 of the flow sheet.

The hexavalent chromium in the anolyte is reduced to chromium valence III with a common reducing agent, organic or inorganic. This step is denoted by box 14 of the flow sheet. This reduced anolyte is used to dissolve further iron-chromium alloy. The cyclic use of this reduced anolyte is indicated by the line connecting box 14 and box 1 of the flow sheet.

As electrowinning progresses the catholyte overflow is fed back to the chrome alum ager. This is shown on the flow sheet by the line connecting box 13 with box 10.

The major portion of chrome alum mother liquor, obtained by filtration of the chrom alum crystals from the solution, is recycled to the leaching step to provide for cyclic operation of the process. This cyclic use is indicated by the line connecting box 11 to box 1 of the flow sheet. A minor portion of this chrome alum mother liquor is treated to remove metallic impurities before being recycled to the leaching step. This purification is accomplished by adding the minor portion of chrome alum mother liquor to a hot aqueous solution of an alkali or an alkaline earth metal base, for example sodium carbonate, under substantially non-oxidizing conditions to a final pH below 3.8 to yield a granular basic chromium sulfate precipitate. This step is shown by box 15 of the flow sheet. This precipitate is filtered and washed free of soluble metallic impurities, such as iron, cobalt, nickel, manganese, copper, and molybdenum, as is illustrated by box 16 of the flow sheet. The basic chromium sulfate precipitate is then recycled to the leaching step, as is indicated by the line connecting box 16 to box 1 of the flow sheet.

We have discovered that by providing for the purification of a minor portion of the chrome alum mother liquor the cycle can be operated continuously without the progressive build-up of metallic impurities in the cycle, which result in decreased current efficiency. The purification is accomplished by a precipitation step under controlled conditions, and results in an effective separation of the chromium ions from those of the metallic impurities.

We have found that as the minor portion of chrome alum mother liquor is added to the alkali or alkaline earth metal base an initial precipitation of chromium and other unwanted metallic impurities, such as iron, occurs under non-oxidizing atmospheric conditions at a pH of about 9.0. Then as additional amounts are added, and the pH decreases, the initial precipitates containing impurities go into solution. For example, the iron precipitate will go into solution at a pH of about 6.0.

As the pH is brought to the final value of about 3.8 complete resolution of the impurities is accomplished and a granular basic chromium sulfate is precipitated.

We have discovered that the percentage of impurities in the basic chromium sulfate precipitate can be controlled by regulation of the final pH in the precipitation step. As the final pH is reduced the percentage of impurities in the precipitate is correspondingly reduced. This control, coupled with carrying out the precipitation operation under substantially non-oxidizing conditions, results in marked decrease in the percentage of metallic impurities in the basic chromium sulfate precipitate. However, it must be pointed out that as the final pH is reduced to obtain a decrease in impurity content in the precipitate, there is a reduction in the percentage of the total chromium that is precipitated. Therefore, efficiency demands that the final pH must not be reduced to too low a value.

In the electrowinning cell the cathode plates are preferably made of stainless steel and the anodes of lead-1 per cent silver alloy.

The catholyte temperature is maintained above approximately 30° C. and electrowinning is carried out at that value of catholyte pH that will give maximum current efficiency for the selected value of catholyte temperature. For example, at 60° C. a catholyte pH in the range 2.45 to 2.65 would give maximum efficiency.

An example setting forth quantitatively the constituents at each step for one complete cycle of a typical operation under the process of this invention is as follows:

400 grams of high carbon ferrochromium (68.46% Cr, 25.00% Fe) was digested with 263 grams of 95.5% make-up sulfuric acid, 120 grams of ammonium sulfate crystals, 4540 cc. of recycled chrome alum mother liquor (containing 20.0 grams/liter Cr, 5.0 grams/liter Fe, 61.0 grams/liter $NH_3$, 112.0 grams/liter $H_2SO_4$), and 121 grams of basic chromium sulfate. The leach liquor so formed was filtered and the 5660 cc. of filtrate was found to contain 83.0 grams/liter Cr, 22.6 grams/liter Fe, 66.0 grams/liter $HN_3$, and 100.0 grams/liter $H_2SO_4$. To this was added, in the conditioning step, 1440 cc. of ammonia-bearing chrome solution consisting of 22.0 grams/liter Cr, 20.0 grams/liter Fe, 64.0 grams/liter $NH_3$. The resulting solution was conditioned at approximately 80° C. and then cooled to approximately 5°–10° C. to obtain crystallization. By filtration, 1560 grams of crude iron-ammonium sulfate crystals were separated and were found to consist of 2.1% Cr, 8.0% Fe and 5.6% $NH_3$.

These crude crystals were dissolved in 1225 cc. of water to which make-up ammonium sulfate was added. This solution was heated to approximately 80° C. and then cooled to 5°–10° C. to produce a recrystallization of iron-ammonium sulfate crystals which were analyzed and found to weigh 760 grams and to contain, when separated from the chrome solution, 0.26% Cr, 12.9% Fe and 7.8% $NH_3$.

The filtrate obtained after the first crystallization step above was found to consist of 6200 cc. of 71.0 grams/liter Cr, 5.0 grams/liter Fe, and 60.0 grams/liter $NH_3$. This solution was introduced into the chrome alum ageing tank. Into the chrome alum ageing tank was also introduced the catholyte overflow solution consisting of 700 cc. of 40.0 grams/liter Cr, and 76.0 grams/liter $NH_3$. After ageing, the chrome alum crystals obtained were removed from the mother liquor by filtration. These crystals were found to weigh 3660 grams, occupy a volume of 2020 cc., and consist of 10% Cr and 3.25% $NH_3$. The crystals were then dissolved in 1370 cc. of water and introduced into the electrolytic cell as catholyte feed. The metal formed contained 272 grams of chromium, and the anolyte, after being reduced by 50 grams of molasses, was found to consist of 2690 cc. of solution containing 25.0 grams/liter Cr, 25 grams/liter $NH_3$, and 295.0 grams/liter $H_2SO_4$. This reduced anolyte was recycled to the leaching step.

The chrome alum mother liquor obtained from the filtration step after the chrome alum ageing tank had a volume of 5040 cc. of which 4540 cc. was recycled to the leaching step.

The remaining 500 cc. of mother liquor was added, under conditions herein disclosed, to a hot aqueous solution containing 88 grams of sodium carbonate. After filtering to remove the solvent metallic impurities, it was found that 121.0 grams of basic chromium sulfate precipitate (10.0 grams Cr—dry weight basis, 4.0 grams $SO_4$—dry weight basis, and 94 cc. water of hydration plus free water) was formed. This precipitate was recycled to the leaching step.

What is claimed is:

1. In a cyclic process for the electrowinning of metallic chromium utilizing a compartment cell and an electrolyte prepared from an iron-chromium alloy, wherein said iron-chromium alloy is leached with sulfuric acid, successively crystallized to remove iron impurities and produce chromium ammonium alum crystals and a chrominum ammonium alum mother liquor, said crystals being dissolved to form the electrolyte, and said mother liquor being recycled to the leaching step, the improvement which comprises recycling the major portion of said chromium ammonium alum mother liquor to said leaching step; adding a minor portion of said chromium ammonium alum mother liquor, under substantially non-oxidizing conditions, to an aqueous solution containing a base selected from the group consisting of the alkalies and alkaline earth metal bases at a temperature above 60° C. until a final pH below approximately 3.8 is obtained to form a basic chromium sulfate precipitate; separating said precipitate from the solution containing the metallic impurities; and adding said precipitate to the leaching step.

2. The process of claim 1 wherein sodium carbonate is used as the base.

3. In a cyclic process for the electrowinning of metalic chromium utilizing a compartment cell and an electrolyte prepared from iron-chromium alloys, the steps of digesting an iron-chromium alloy with sulfuric acid and adding thereto ammonium sulfate crystals; filtering the solution so formed to remove the residue; adding to the filtrate, as a conditioning step, an ammonium solution and heating the resulting solution to approximately 80° C.; cooling said resulting solution to a temperature between approximately 5° C. to 10° C. to obtain by crystallization crude iron-ammonium sulfate crystals and a chrome liquor; separating said crystals from said chrome liquor; dissolving said crystals in water; adding ammonium sulfate salts to the solution so formed and heating the resulting solution to approximately 80° C.; cooling said resulting solution to a temperature between approximately 5° C. and 10° C. to obtain by recrystallization higher purity iron-ammonium sulfate crystals; separating said iron-ammonium sulfate crystals from the ammonia-bearing chrome solution, and recycling said solution to said conditioning step; ageing said chrome liquor to obtain crystals of chromium ammonium alum and a chromium ammonium alum mother liquor; separating said chromium ammonium alum crystals from said mother liquor; dissolving said chromium ammonium alum crystals in water to form the cell feed; introducing said cell feed into the cathode compartment of a diaphragm electrolytic cell and electrolyzing to form metallic chromium at the cathode and to form in the anode compartment of such cell an anolyte; treating said anolyte with a reducing agent to convert the chromium ions therein to the trivalent state; recycling said reduced anolyte to leach an additional portion of iron-chromium alloy; recycling the catholyte overflow solution to said chromium ammonium alum ageing step; recycling the major portion of said chromium ammonium alum mother liquor to said leaching step; adding the remaining minor portion of said chromium ammonium alum mother liquor, under substantially non-oxidizing conditions, to an aqueous solution containing a base selected from the group consisting of the alkalies and alkaline earth metal bases at a temperature above 60° C. until a final pH below approximately 3.8 is obtained, to form a basic chromium sulfate precipitate; separating said precipitate from the solution containing the metallic impurities; and adding said precipitate to the leaching step.

MICHAEL C. CAROSELLA.
JOHN D. METTLER.

References Cited in the file of this patent

Lloyd et al.: Journal of the Electrochemical Society, vol. 97 (July 1950), pp. 227–234